W. C. OLSON.
PULLEY ATTACHMENT FOR MOTORS.
APPLICATION FILED JUNE 14, 1919.

1,343,152.

Patented June 8, 1920.

WITNESS:
R. G. Thomas

INVENTOR.
BY William C. Olson

Victor J. Evans
ATTORNEY.

UNITED STATES PATENT OFFICE.

WILLIAM C. OLSON, OF NEW BEDFORD, ILLINOIS.

PULLEY ATTACHMENT FOR MOTORS.

1,343,152. Specification of Letters Patent. Patented June 8, 1920.

Application filed June 14, 1919. Serial No. 304,179.

*To all whom it may concern:*

Be it known that I, WILLIAM C. OLSON, a citizen of the United States, residing at New Bedford, in the county of Bureau and State of Illinois, have invented new and useful Improvements in Pulley Attachments for Motors, of which the following is a specification.

This invention relates to motor attachments and has for its object the provision of a pulley adapted to be clampingly engaged upon the clutch cone or other clutch member of an internal combustion motor when the motor is disposed upon a bench or other support for the purpose of having its bearings readjusted. It is well known in the art that in some instances it has been found preferable in refitting motor bearings to tighten the bearings and run the motor by some exterior power for grinding in or "burning" in the bearings instead of "bluing" and scraping the bearings in the ordinary manner. It is in connection with this operation that my device is adapted for use, my device being a pulley adapted to be clamped upon a clutch element of the motor and being adapted to receive power from some suitable source, as for instance, by a belt driven by an electric or other motor.

An important object is the provision of an attachment of this character which will be simple and inexpensive in manufacture, which may be quickly and easily applied and adjusted to suit varying conditions, and which will be a general improvement in the art.

With the above and other objects and advantages in view, the invention consists in the details of construction to be hereinafter more fully described and claimed, and illustrated in the accompanying drawing, in which—

Figure 1:
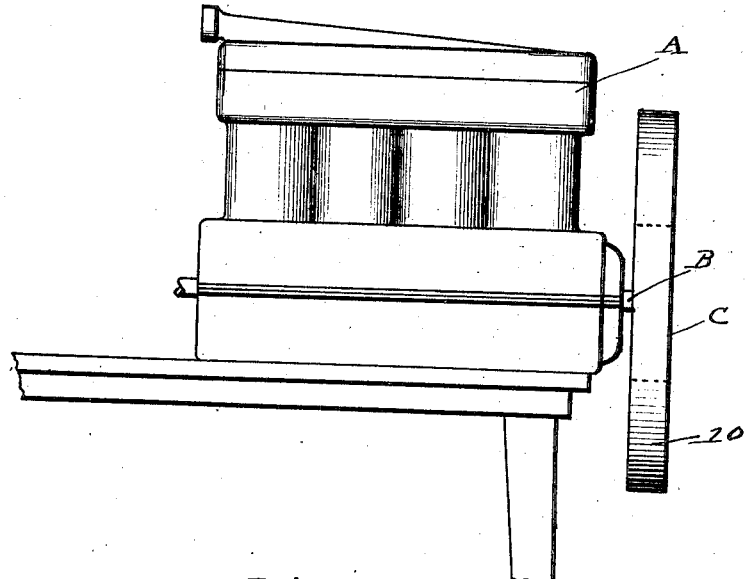
Figure 2:
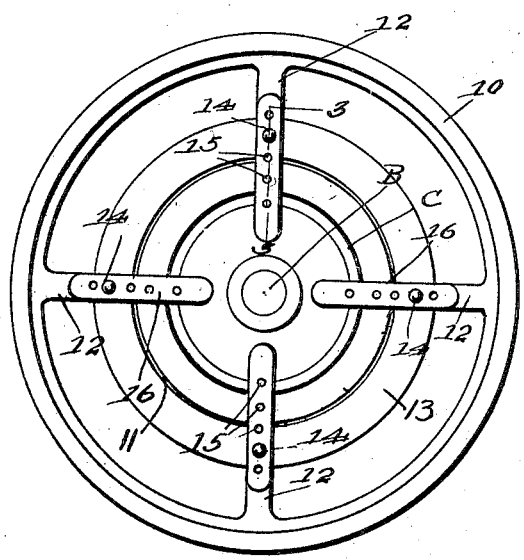
Figure 3:
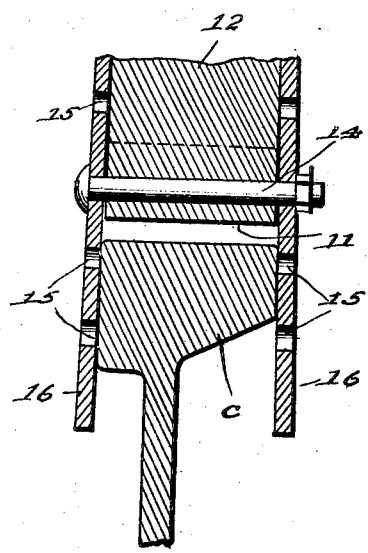

Figure 1 is an elevation of a motor disposed upon a bench and having my device engaged upon a clutch element, Fig. 2 is an end elevation of the motor shaft looking toward the clutch member and showing my device in position, and Fig. 3 is a detail sectional view on the line 3—3 of Fig. 2.

Referring more particularly to the drawing, the letter A designates a motor, B designates the shaft thereof, and C designates a clutch member.

In carrying out my invention I provide a pulley 10 which is formed of any suitable material and of any desired construction and which is provided centrally with an opening 11 of sufficient size to pass over the clutch member C. This pulley may be webbed or not, as preferred, but has radial ribs 12. The inner or hub portion 13 of the pulley has extending transversely therethrough in alinement with the ribs 12, bolts 14 engageable within selected ones of a plurality of holes 15 formed in radially adjustable bars 16 which are disposed in registration with the ribs 12 against one side thereof.

In attaching my pulley to a motor, it will be seen that the pulley is slipped over the clutch member B and the bars 16 are properly adjusted radially by means of the bolts 14 and holes 15 so as to clampingly engage the clutch member for holding the pulley against movement relative thereto.

With my pulley in position, it will be seen that when power is applied thereto, as by means of a suitable belt, not shown, driven by any desired power device, the shaft of the motor will be rotated for grinding or burning in the bearings in order to insure a proper fit thereof.

From the foregoing description and a study of the drawing, it will be apparent that I have thus provided an extremely simple and inexpensive device which may be quickly and easily engaged upon the clutch member of a motor and which is adapted to be driven whereby the motor shaft will be rotated when desired, in carrying out certain operations.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim—

A motor attachment comprising a pulley having a central opening surrounded by a hub portion and having radial ribs extending between said hub portion and the outer periphery of the pulley, bolts passing transversely through the hub portion in line with said ribs, said pulley being adapted to be slipped over a clutch member of a motor, and a bar disposed adjacent each rib upon each side of the pulley in registration with the rib and provided with a plurality of holes selectively engageable by said bolt whereby all of said bars may be adjusted radially for clamping engagement upon the clutch member of the motor.

In testimony whereof I affix my signature.

WILLIAM C. OLSON.